United States Patent
Ren et al.

(10) Patent No.: US 11,405,563 B2
(45) Date of Patent: Aug. 2, 2022

(54) SPATIAL ALIGNMENT TRANSFORM WITHOUT FOV LOSS

(71) Applicant: QUALCOMM Incorporated, San Diego, CA (US)

(72) Inventors: Jianfeng Ren, San Diego, CA (US); Shizhong Liu, San Diego, CA (US); Weiliang Liu, San Diego, CA (US); Kuan-Chen Pan, New Taipei (TW); Nikhil Uchil, San Diego, CA (US); Wei Zou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/094,052

(22) Filed: Nov. 10, 2020

(65) Prior Publication Data

US 2022/0150420 A1    May 12, 2022

(51) Int. Cl.
*H04N 5/262* (2006.01)
*H04N 5/225* (2006.01)
*H04N 5/232* (2006.01)
*G06T 3/00* (2006.01)

(52) U.S. Cl.
CPC ......... *H04N 5/2628* (2013.01); *G06T 3/0093* (2013.01); *H04N 5/2258* (2013.01); *H04N 5/23293* (2013.01)

(58) Field of Classification Search
CPC ............... H04N 5/2628; H04N 5/2258; H04N 5/23293; G06T 3/0093
See application file for complete search history.

(56) References Cited

U.S. PATENT DOCUMENTS

| | | | |
|---|---|---|---|
| 7,206,136 B2 * | 4/2007 | Labaziewicz | H04N 5/225 359/676 |
| 9,325,899 B1 * | 4/2016 | Chou | H04N 5/247 |
| 9,386,229 B2 | 7/2016 | Chang et al. | |
| 9,420,190 B2 * | 8/2016 | Griffith | H04N 5/232 |

(Continued)

FOREIGN PATENT DOCUMENTS

EP    3716103 A2    9/2020

OTHER PUBLICATIONS

International Search Report and Written Opinion—PCT/US2021/054274—ISA/EPO—dated Feb. 23, 2022.

*Primary Examiner* — Timothy J Henn
(74) *Attorney, Agent, or Firm* — Polsinelli LLP

(57) ABSTRACT

This disclosure provides devices, methods, computer-readable medium, and means for spatial alignment transform. In some aspects, a device may perform operations including capturing a first image of a scene using a first sensor at a first zoom ratio, capturing a second image of the scene using a second sensor at a second zoom ratio, the first image having a different field-of-view (FOV) than the second image, determining a translation matrix based on one or more spatial misalignments between the first image and the second image, determining a confidence associated with the translation matrix, in response to the confidence being greater than a confidence threshold, determining a weighting factor based on the first zoom ratio, the second zoom ratio, and a current zoom ratio of the device, applying the weighting factor to the translation matrix, and warping the first image to the second image using the weighted translation matrix.

30 Claims, 8 Drawing Sheets

(56) References Cited

U.S. PATENT DOCUMENTS

| | | | |
|---|---|---|---|
| 9,485,432 B1* | 11/2016 | Medasani | G06K 9/40 |
| 10,290,111 B2 | 5/2019 | Jia et al. | |
| 10,356,300 B2 | 7/2019 | Lee et al. | |
| 2016/0191814 A1* | 6/2016 | Scarff | G06T 3/4007 |
| | | | 348/240.1 |
| 2017/0230585 A1 | 8/2017 | Nash et al. | |
| 2018/0033155 A1* | 2/2018 | Jia | H04N 5/23235 |
| 2018/0048825 A1* | 2/2018 | Wang | G02B 27/646 |
| 2018/0096487 A1 | 4/2018 | Nash et al. | |
| 2018/0098000 A1* | 4/2018 | Park | G02B 13/04 |
| 2018/0160046 A1 | 6/2018 | Nash et al. | |
| 2018/0183982 A1* | 6/2018 | Lee | G02B 13/001 |
| 2019/0297275 A1 | 9/2019 | Lee et al. | |

\* cited by examiner

SPATIAL ALIGNMENT TRANSFORM WITHOUT FOV LOSS

TECHNICAL FIELD

This disclosure relates generally to image or video capture devices, including processing of image frames from multiple image sensors by an image signal processor, such as for spatial alignment transform of the image frames.

DESCRIPTION OF THE RELATED TECHNOLOGY

Many devices include multiple image sensors that may be used for capturing one or more image frames. For example, a smartphone or tablet includes multiple image sensors to be used in generating images or video for different imaging applications. One or more image signal processors may process the image frames from the multiple image sensors. The processed image frames may be used by the imaging applications, such as for generating preview images, user photographs, recording video, performing augmented reality operations, and so on.

SUMMARY

The systems, methods, and devices of this disclosure each have several innovative aspects, no single one of which is solely responsible for the desirable attributes disclosed herein.

One innovative aspect of the subject matter described in this disclosure can be implemented in a device. The device may include a processor and a memory coupled to the processor and storing instructions that, when executed by the processor, cause the device to perform operations. The operations may include capturing a first image of a scene using a first sensor at a first zoom ratio, capturing a second image of the scene using a second sensor at a second zoom ratio, the first image having a different field-of-view (FOV) than the second image, determining a translation matrix based on one or more spatial misalignments between the first image and the second image, determining a confidence associated with the translation matrix, in response to the confidence being greater than a confidence threshold, determining a weighting factor based on the first zoom ratio, the second zoom ratio, and a current zoom ratio of the device, applying the weighting factor to the translation matrix, and warping the first image to the second image using the weighted translation matrix.

In some implementations, the first image is captured concurrently with the second image when the current zoom ratio is within an overlap zone spanning between the first zoom ratio and the second zoom ratio. In some instances, the weighting factor is 0% when the current zoom ratio is equal to the first zoom ratio and the weighting factor is 100% when the current zoom ratio is equal to the second zoom ratio. In some other instances, the weighting factor corresponds to an identity matrix when the confidence is not greater than the confidence threshold. In some implementations, the first image has a wider FOV than the second image. In some instances, the first sensor is a wide-angle image sensor and the second sensor is a tele image sensor.

In some implementations, execution of the instructions causes the device to perform operations further including incrementally increasing the weighting factor as the current zoom ratio increases from the first zoom ratio to the second zoom ratio, and incrementally decreasing the weighting factor as the current zoom ratio decreases toward the first zoom ratio within the overlap zone. In some other implementations, execution of the instructions causes the device to perform operations further including generating a preview image based on the warped first image and the second image, and displaying the preview image to a user of the device.

In some implementations, execution of the instructions causes the device to perform operations further including scaling the first image to match the FOV of the second image, and identifying the one or more spatial misalignments between the scaled first image and the second image. In some other implementations, execution of the instructions causes the device to perform operations further including refraining from determining an additional translation matrix when the confidence is greater than the confidence threshold.

Another innovative aspect of the subject matter described in this disclosure can be implemented as a method for spatial alignment transform. The method may be performed by a device, and may include capturing a first image of a scene using a first sensor of the device at a first zoom ratio, capturing a second image of the scene using a second sensor of the device at a second zoom ratio, the first image having a different field-of-view (FOV) than the second image, determining a translation matrix based on one or more spatial misalignments between the first image and the second image, determining a confidence associated with the translation matrix, in response to the confidence being greater than a confidence threshold, determining a weighting factor based on the first zoom ratio, the second zoom ratio, and a current zoom ratio of the device, applying the weighting factor to the translation matrix, and warping the first image to the second image using the weighted translation matrix.

In some implementations, the first image is captured concurrently with the second image when the current zoom ratio is within an overlap zone spanning between the first zoom ratio and the second zoom ratio. In some instances, the weighting factor is 0% when the current zoom ratio is equal to the first zoom ratio and the weighting factor is 100% when the current zoom ratio is equal to the second zoom ratio. In some other instances, the weighting factor corresponds to an identity matrix when the confidence is not greater than the confidence threshold. In some implementations, the first image has a wider FOV than the second image. In some instances, the first sensor is a wide-angle image sensor and the second sensor is a tele image sensor.

In some implementations, the method further includes incrementally increasing the weighting factor as the current zoom ratio increases from the first zoom ratio to the second zoom ratio, and incrementally decreasing the weighting factor as the current zoom ratio decreases toward the first zoom ratio within the overlap zone. In some other implementations, the method further includes generating a preview image based on the warped first image and the second image, and displaying the preview image to a user of the device.

In some implementations, the method further includes scaling the first image to match the FOV of the second image, and identifying the one or more spatial misalignments between the scaled first image and the second image. In some other implementations, the method further includes refraining from determining an additional translation matrix when the confidence is greater than the confidence threshold.

Another innovative aspect of the subject matter described in this disclosure can be implemented in a non-transitory computer-readable medium. The non-transitory computer-readable medium can store instructions that, when executed by a processor of a device, cause the device to perform operations. In some implementations, the operations include capturing a first image of a scene using a first sensor of the device at a first zoom ratio, capturing a second image of the scene using a second sensor of the device at a second zoom ratio, the first image having a different field-of-view (FOV) than the second image, determining a translation matrix based on one or more spatial misalignments between the first image and the second image, determining a confidence associated with the translation matrix, in response to the confidence being greater than a confidence threshold, determining a weighting factor based on the first zoom ratio, the second zoom ratio, and a current zoom ratio of the device, applying the weighting factor to the translation matrix, and warping the first image to the second image using the weighted translation matrix.

In some implementations, the first image is captured concurrently with the second image when the current zoom ratio is within an overlap zone spanning between the first zoom ratio and the second zoom ratio. In some instances, the weighting factor is 0% when the current zoom ratio is equal to the first zoom ratio and the weighting factor is 100% when the current zoom ratio is equal to the second zoom ratio. In some other instances, the weighting factor corresponds to an identity matrix when the confidence is not greater than the confidence threshold. In some implementations, the first image has a wider FOV than the second image. In some instances, the first sensor is a wide-angle image sensor and the second sensor is a tele image sensor.

In some implementations, the operations further include incrementally increasing the weighting factor as the current zoom ratio increases from the first zoom ratio to the second zoom ratio, and incrementally decreasing the weighting factor as the current zoom ratio decreases toward the first zoom ratio within the overlap zone. In some other implementations, the operations further include generating a preview image based on the warped first image and the second image, and displaying the preview image to a user of the device.

In some implementations, the operations further include scaling the first image to match the FOV of the second image, and identifying the one or more spatial misalignments between the scaled first image and the second image. In some other implementations, the operations further include refraining from determining an additional translation matrix when the confidence is greater than the confidence threshold.

Another innovative aspect of the subject matter described in this disclosure can be implemented in a device. The device may include means for capturing a first image of a scene using a first sensor at a first zoom ratio, means for capturing a second image of the scene using a second sensor at a second zoom ratio, the first image having a different field-of-view (FOV) than the second image, means for determining a translation matrix based on one or more spatial misalignments between the first image and the second image, means for determining a confidence associated with the translation matrix, means for, in response to the confidence being greater than a confidence threshold, determining a weighting factor based on the first zoom ratio, the second zoom ratio, and a current zoom ratio of the device, means for applying the weighting factor to the translation matrix, and means for warping the first image to the second image using the weighted translation matrix.

In some implementations, the first image is captured concurrently with the second image when the current zoom ratio is within an overlap zone spanning between the first zoom ratio and the second zoom ratio. In some instances, the weighting factor is 0% when the current zoom ratio is equal to the first zoom ratio and the weighting factor is 100% when the current zoom ratio is equal to the second zoom ratio. In some other instances, the weighting factor corresponds to an identity matrix when the confidence is not greater than the confidence threshold. In some implementations, the first image has a wider FOV than the second image. The first and second sensor may be a wide-angle image sensor and a tele image sensor, respectively.

In some implementations, the device may further include means for incrementally increasing the weighting factor as the current zoom ratio increases from the first zoom ratio to the second zoom ratio, and incrementally decreasing the weighting factor as the current zoom ratio decreases toward the first zoom ratio within the overlap zone. In some other implementations, the device may further include means for generating a preview image based on the warped first image and the second image, and displaying the preview image to a user of the device.

In some implementations, the device may further include means for scaling the first image to match the FOV of the second image, and identifying the one or more spatial misalignments between the scaled first image and the second image. In some other implementations, the device may further include means for refraining from determining an additional translation matrix when the confidence is greater than the confidence threshold.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
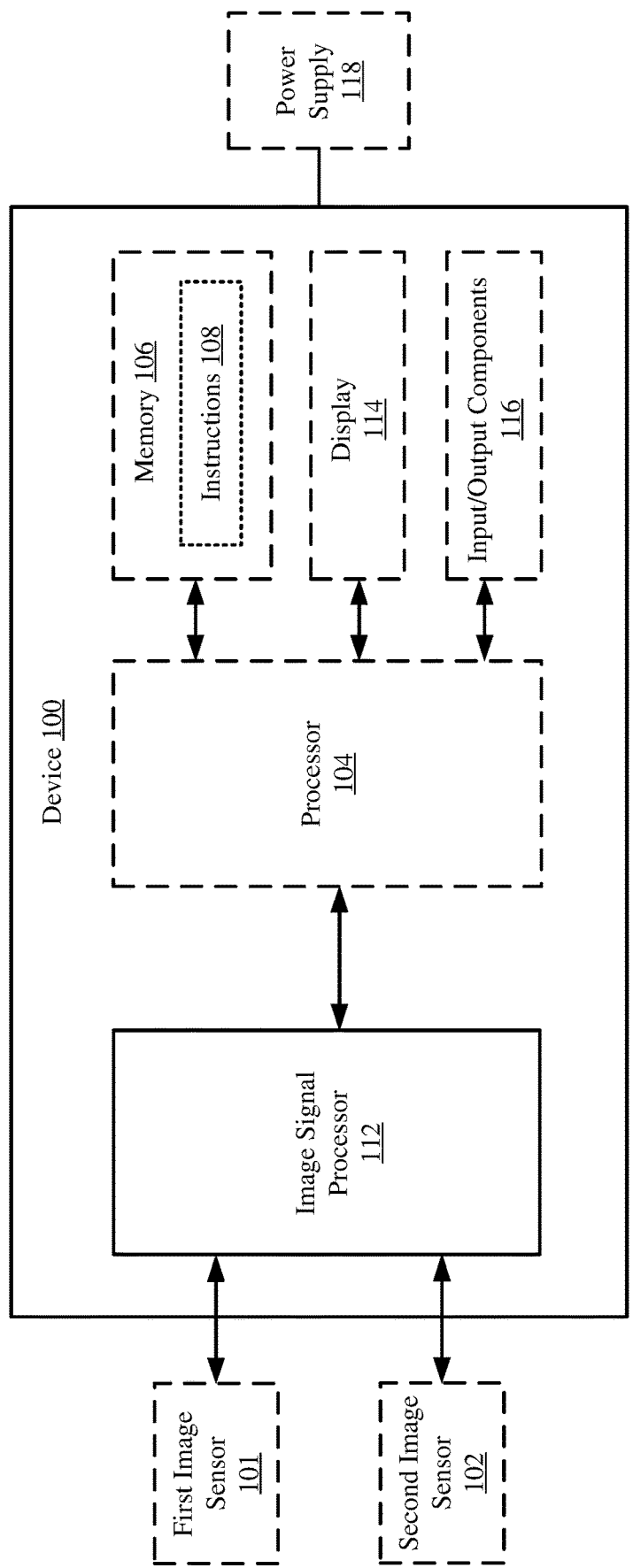
FIG. 1 shows a block diagram of an example device for performing spatial alignment transform of image frames.

Aspects of the present disclosure may be used for capturing image frames using multiple image sensors of a device, such as a combination of ultra-wide (high field-of-view (FOV)), wide, tele, and ultra-tele (low FOV) sensors. Some aspects include processing the captured image frames, such as by performing spatial alignment transform of one or more of the captured image frames while the device transitions from capturing images of a scene using a first of the multiple image sensors to capturing images of the scene using a second of the multiple image sensors.

An example device, such as a smartphone, may include a configuration of two, three, four, or more cameras on a backside of the device. Devices with multiple image sensors include one or more image signal processors, Computer Vision Processors (CVPs), or other suitable circuitry for processing images captured by the image sensors. The one or more image signal processors may provide the processed image frames to a memory and/or a processor (such as an application processor, an image front end (IFE), an image processing engine (IPE), or other suitable processing circuitry) for further processing, such as for encoding or other manipulation.

As used herein, an image sensor may refer to the image sensor itself and any other suitable components coupled to the image sensor. For example, an image sensor may also refer to other components of a camera, including a shutter, buffer, or other readout circuitry. The image sensor may further refer to an analog front end or other circuitry for converting analog signals to digital representations for the frame. Therefore, the term "image sensor" herein may refer to any suitable components for capture and readout of an image frame to an image signal processor.

An example multiple-sensor device may capture "wide" images of a scene using a wide sensor when a current zoom ratio of the device is a first value, and the device may switch to capturing "tele" images of the scene using a tele sensor when the current zoom ratio is a second, higher value. The device may capture an image of the scene using both sensors concurrently or approximately concurrently when the current zoom ratio is within a defined range of values, which may be referred to herein as an "overlap zone." The device may use image data from the one or more sensors to generate, for example, preview images of the scene for display to a user of the device.

However, due to manufacturing imperfections, the multiple sensors and/or the captured images may be spatially misaligned, which may result in misalignment errors related to the generated images when the current zoom ratio of the device is within the overlap zone. The misalignment errors may cause visual imperfections in the corresponding preview images. Some devices may use translation matrices to warp (e.g., shift and/or rotate) the images into spatial alignment, which may resolve some of the misalignment errors. Unfortunately, in doing so, conventional devices crop portions of the higher FOV images and generate corresponding images with reduced FOVs and quality, i.e., fewer pixels.

Aspects of the present disclosure provide a multiple-sensor device that can smoothly transition from capturing images of a scene using a first one of the sensors to capturing images of the scene using a second one of the sensors by warping one or more of the captured images without reducing FOV or quality when generating corresponding images.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure. Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices.

In the figures, a single block may be described as performing a function or functions; however, in actual practice, the function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Aspects of the present disclosure are applicable to any suitable electronic device including or coupled to two or more image sensors capable of capturing image frames (or "frames"). Further, aspects of the present disclosure may be implemented in devices having or coupled to image sensors of the same or different capabilities and characteristics (such as resolution, shutter speed, sensor type, and so on).

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the below description and examples use the term "device" to describe various aspects of the disclosure, the term "device" is not limited to a specific configuration, type, or number of objects. As used herein, an apparatus may include a device or a portion of the device for performing the described operations.

FIG. 1 shows a block diagram of an example device 100 for performing spatial alignment transform of image frames. The device 100 may include, or otherwise be coupled to, an image signal processor 112 for processing image frames from multiple image sensors, such as a first image sensor 101 and a second image sensor 102. In some implementations, the device 100 also includes or is coupled to a processor 104 and a memory 106 storing instructions 108. The device 100 may also include or be coupled to a display 114 and a number of input/output (I/O) components 116. The device 100 may further include or be coupled to a power supply 118 for the device 100, such as a battery or a component to couple the device 100 to an energy source. The device 100 may also include or be coupled to additional features or components not shown. In one example, a wireless interface, which may include a number of transceivers and a baseband processor, may be included for a wireless communication device. In another example, one or more other sensors (such as a gyroscope or a global positioning system (GPS) receiver) may be included in or coupled to the device. In a further example, an analog front end to convert analog image frame data to digital image frame data may be coupled between the image sensors 101 and 102 and the image signal processor 112.

The first image sensor 101 and the second image sensor 102 are configured to capture one or more image frames. For example, the first image sensor 101 and the second image sensor 102 may be included in one multiple camera configuration or in separate single cameras or separate multiple camera configurations (such as a dual camera configuration, a triple camera configuration, and so on, for a smartphone or other suitable device). The image sensors 101 and 102 may also include or be coupled to one or more lenses for focusing light, one or more apertures for receiving light, one or more shutters for blocking light when outside an exposure window, one or more color filter arrays (CFAs) for filtering light outside of specific frequency ranges, one or more analog front ends for converting analog measurements to digital information, or other suitable components for imaging. The device 100 may also include a flash, a depth sensor, a GPS, or other suitable components for imaging.

The image signal processor 112 processes image frames captured by the image sensors 101 and 102. While FIG. 1 illustrates the device 100 as including two image sensors 101 and 102 coupled to the image signal processor 112, any number of image sensors may be coupled to the image signal processor 112. In addition, any number of additional image sensors or image signal processors may exist for the device 100.

In some aspects, the image signal processor 112 may execute instructions from a memory, such as instructions 108 from the memory 106, instructions stored in a separate memory coupled to or included in the image signal processor 112, or instructions provided by the processor 104. In addition, or in the alternative, the image signal processor 112 may execute software and/or may include specific hardware (such as one or more integrated circuits (ICs)) to perform one or more operations described in the present disclosure.

In some implementations, the memory 106 may include a non-transient or non-transitory computer readable medium storing computer-executable instructions 108 to perform all or a portion of one or more operations described in this disclosure. In some implementations, the instructions 108 include a camera application (or other suitable application) to be executed by the device 100 for generating images or videos. The instructions 108 may also include other applications or programs executed by the device 100, such as an operating system and specific applications other than for image or video generation. Execution of the camera application, such as by the processor 104, may cause the device 100 to generate images using the image sensors and the image signal processor 112. The memory 106 may also be accessed by the image signal processor 112 to store processed frames or may be accessed by the processor 104 to obtain the processed frames. In some other implementations, the device 100 does not include the memory 106. For example, the device 100 may be a circuit including the image signal processor 112, and the memory may be outside the device 100. The device 100 may be coupled to the memory and configured to access the memory for writing processed frames.

In some implementations, the processor 104 may include one or more general purpose processors capable of executing scripts or instructions of one or more software programs, such as instructions 108 stored within the memory 106. For example, the processor 104 may include one or more application processors configured to execute the camera application (or other suitable application for generating images or video) stored in the memory 106. In executing the camera application, the processor 104 may be configured to instruct the image signal processor 112 to perform one or more operations with reference to the image sensors 101 or 102. Execution of instructions 108 outside of the camera application by the processor 104 may also cause the device 100 to perform any number of functions or operations. In some implementations, the processor 104 may include ICs or other hardware in addition to the ability to execute software to cause the device 100 to perform a number of functions or operations, such as the operations described herein. In some other implementations, the device 100 does not include the processor 104.

In some implementations, at least one of the image signal processor 112 or the processor 104 can execute instructions to perform various operations described herein. For example, execution of the instructions can determine a translation matrix based on one or more spatial misalignments between a first image of a scene captured using the first image sensor 101 at a first zoom ratio and a second image of the scene captured using the second image sensor 102 at a second zoom ratio. In some aspects, the first image may have a different FOV than the second image. Execution of the instructions can also determine a confidence associated with the translation matrix. Execution of the instructions can also determine a weighting factor based on the first zoom ratio, the second zoom ratio, and a current zoom ratio of the device. Thereafter, execution of the instructions can apply the weighting factor to the translation matrix and warp the first image to the second image using the weighted translation matrix.

In some implementations, the display 114 may include one or more suitable displays or screens allowing for user interaction and/or to present items to the user, such as a preview of the image frames being captured by the image sensors 101 and 102. In some aspects, the display 114 is a touch-sensitive display. The I/O components 116 may be or include any suitable mechanism, interface, or device to receive input (such as commands) from the user and to provide output to the user. For example, the I/O components 116 may include (but are not limited to) a graphical user interface (GUI), a keyboard, a mouse, a microphone, speakers, a squeezable bezel, one or more buttons (such as a power button), a slider, a switch, and so on.

While shown to be coupled to each other via the processor 104, the processor 104, the memory 106, the image signal processor 112, the display 114, and the I/O components 116 may be coupled to each another in other various arrangements, such as via one or more local buses, which are not shown for simplicity. While the image signal processor 112 is illustrated as separate from the processor 104, the image signal processor 112 may be a core of a processor 104 that is an application processor unit (APU), included in a system on chip (SoC), or otherwise included with the processor 104. While the device 100 is referred to in the examples herein for performing aspects of the present disclosure, some device components may not be shown in FIG. 1 to prevent obscuring aspects of the present disclosure. Additionally, other components, numbers of components, or combinations of components may be included in a suitable device for performing aspects of the present disclosure. As such, the present disclosure is not limited to a specific device or configuration of components, including the device 100.

Figure 2:
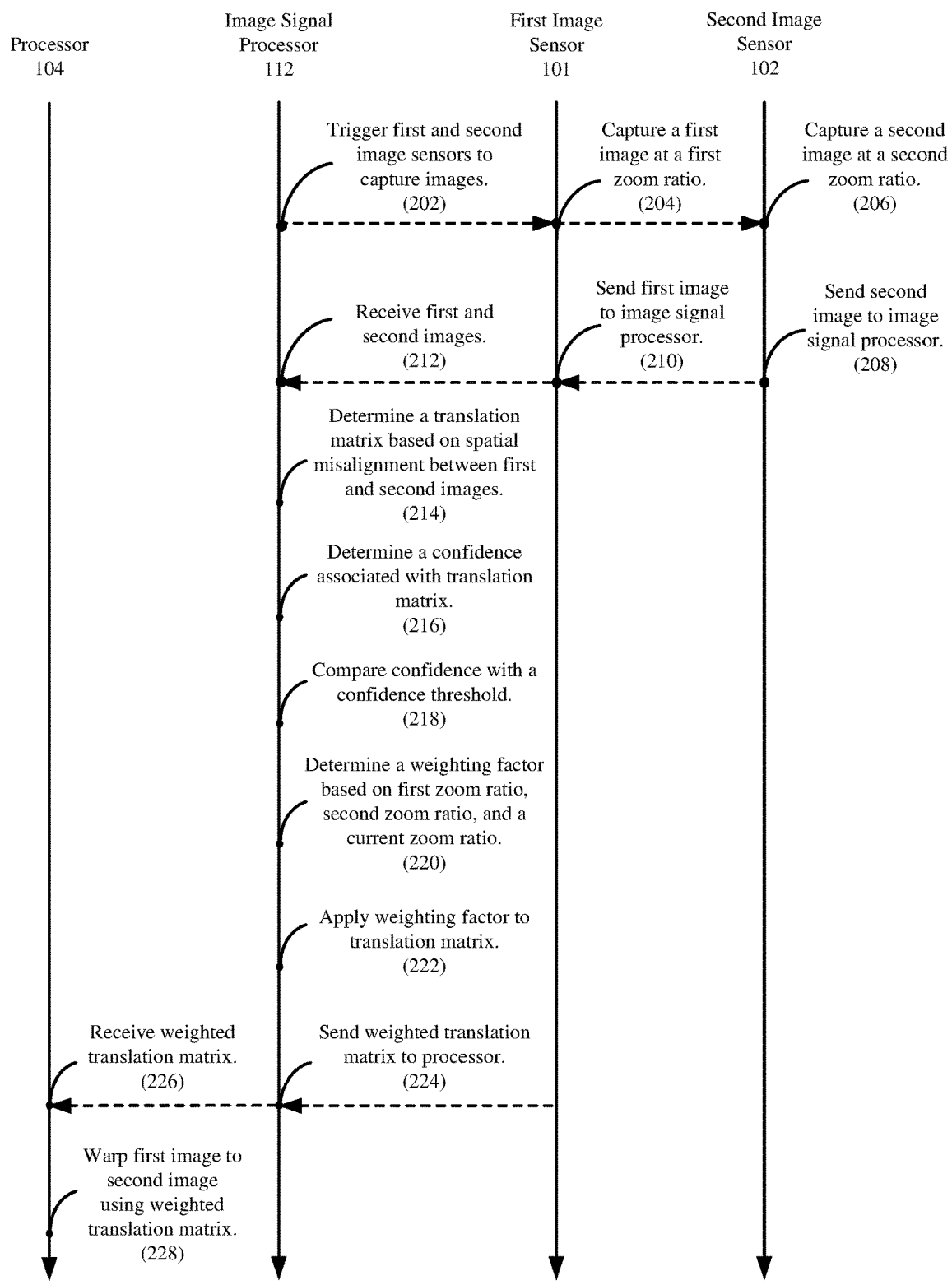
FIG. 2 shows a timing diagram of an example device performing spatial alignment transform of image frames.

FIG. 2 shows a timing diagram 200 of an example device performing spatial alignment transform of image frames. The example device may be an example implementation of the device 100 shown in FIG. 1. While timing diagram 200 is described with reference to the devices and components shown in FIG. 1, any suitable device or device components may perform the described operations for timing diagram 200. The operations shown in timing diagram 200 may be performed while a current zoom ratio of the device 100 is within an overlap zone spanning between a first and a second zoom ratio, as described in more detail below. In some implementations, the first image sensor 101 is a wide-angle image sensor and the second image sensor 102 is a tele image sensor.

The image signal processor 112 triggers the first image sensor 101 and the second image sensor 102 to capture a first image and a second image, respectively (202). In some implementations, the first image may have a wider FOV than the second image. While timing diagram 200 illustrates the triggers being provided to the image sensors 101 and 102 concurrently, the triggers may be provided at different times or at any suitable time or times. Upon receiving the trigger, the first image sensor 101 may capture a first image at a first zoom ratio (204), and the second image sensor 102 may capture a second image at a second zoom ratio (206). In some implementations, the image sensors may capture the images concurrently or approximately concurrently.

The second image sensor 102 may send the second image to the image signal processor 112 (208), and the first image sensor 101 may send the first image to the image signal processor 112 (210). In some instances, the image sensors may send the captured images to the processor concurrently or approximately concurrently. The image signal processor 112 receives the first and second images from the first image sensor 101 and the second image sensor 102, respectively (212). In some instances, the image signal processor 112 may receive the images concurrently or approximately concurrently.

The image signal processor 112 may determine a translation matrix based on the one or more spatial misalignments between the first image and the second image (214). In some implementations not shown in timing diagram 200, the image signal processor 112 scales the first image to match the FOV of the second image and identifies the one or more spatial misalignments between the scaled first image and the second image. The image signal processor 112 may determine a confidence associated with the translation matrix (216) and compare the confidence with a confidence threshold (218). In some implementations, the confidence threshold may be a predetermined value and/or an adjustable value.

In response to the confidence being greater than the confidence threshold, the image signal processor 112 may determine a weighting factor based on the first zoom ratio, the second zoom ratio, and a current zoom ratio of the device 100 (220). In some implementations, the weighting factor may be 0% when the current zoom ratio is equal to the first zoom ratio and the weighting factor may be 100% when the current zoom ratio is equal to the second zoom ratio. In some instances, the image signal processor 112 may refrain from determining an additional translation matrix when the confidence is greater than the confidence threshold. In some other implementations, when the confidence is not greater than the confidence threshold, the weighting factor may be an identity matrix.

The image signal processor 112 may then apply a weighting factor to the translation matrix (222). In some implementations, the image signal processor 112 may increase the weighting factor as the current zoom ratio increases toward the second zoom ratio within the overlap zone and decrease the weighting factor as the current zoom ratio decreases toward the first zoom ratio within the overlap zone. The image signal processor 112 may send the weighted translation matrix to the processor 104 (224), and the processor 104 may then receive the weighted translation matrix (226). The processor 104 may then warp the first image to the second image using the weighted translation matrix (228). In some instances, the device 100 may generate a preview image based on the warped first image and the second image and display the preview image to a user of the device 100.

The operations described with reference to timing diagram 200 may be expanded to any number of image sensors coupled to an image signal processor and any number of frames to be provided to an image signal processor. As such, timing diagram 200 shows two image sensors exclusively for clarity in explaining aspects of the present disclosure—that is, the present disclosure is not limited to a specific number of image sensors. For example, in some implementations, the device 100 may have some combination of an ultra-wide sensor, a wide sensor, a tele sensor, an ultra-tele sensor, and any other suitable type of sensor.

Figure 3:
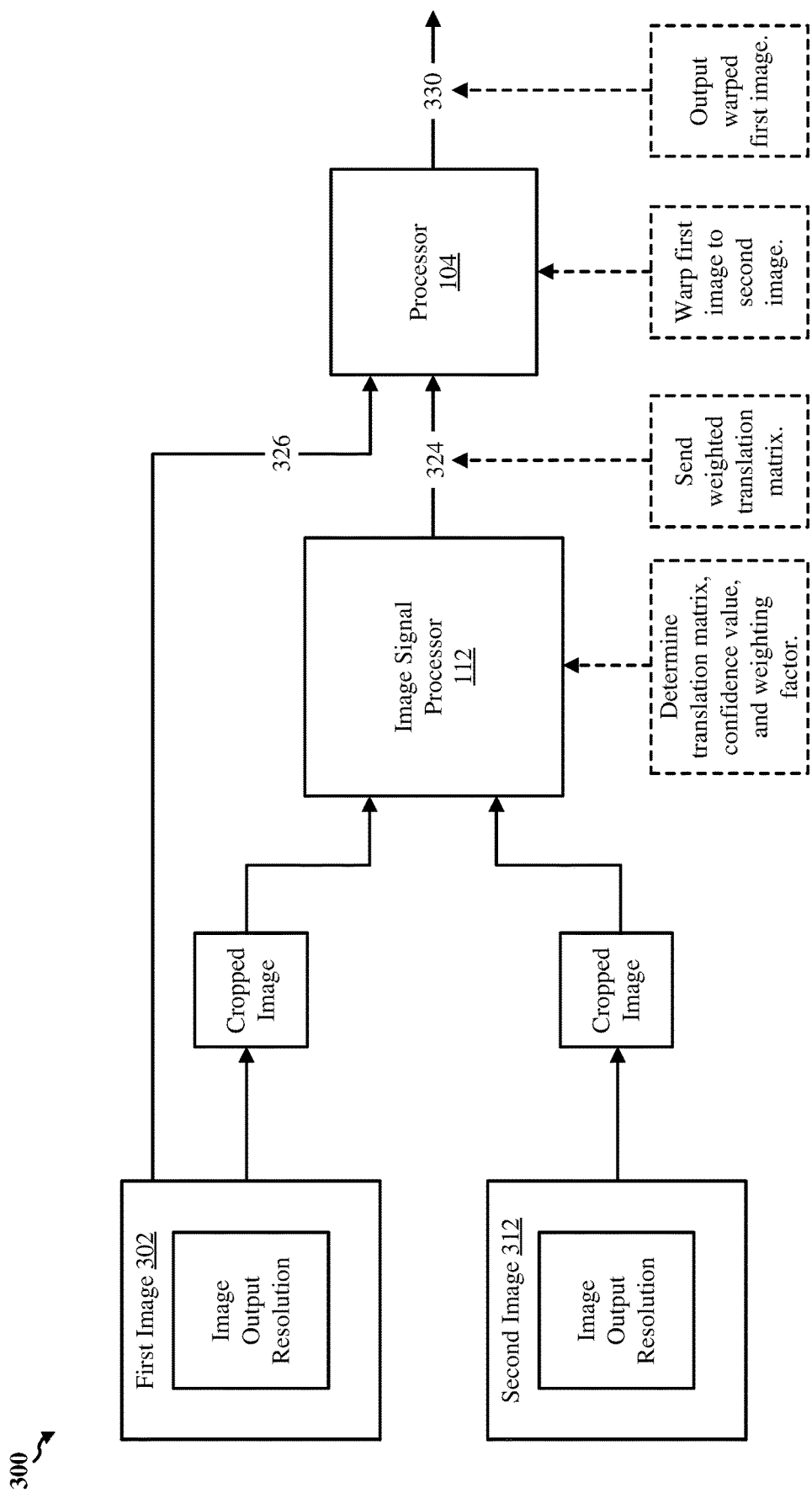
FIG. 3 shows an example data flow for a device performing spatial alignment transform of one or more image frames.

FIG. 3 shows an example data flow 300 for a device performing spatial alignment transform of one or more image frames. The device may be an example implementation of the device 100 shown in FIG. 1. While data flow 300 is described with reference to the devices, components, and operations shown in the previous Figures, any suitable device or device components may perform the operations described in relation to data flow 300. In some implementations, the operations shown in data flow 300 may be performed while a current zoom ratio of the device 100 is within an overlap zone.

A first image 302 and a second image 312 are captured by a first and a second image sensor of the device 100, respectively, which is not shown for simplicity. In some implementations, the first and second image sensors may be example implementations of the first image sensor 101 and the second image sensor 102 of FIG. 1, respectively. As a non-limiting example, the first image 302 may be a wide-angle image captured at a first zoom ratio (e.g., 4.9×), and the second image 312 may be a tele image captured at a second zoom ratio (e.g., 5.0×). In some implementations, the first image 302 and the second image 312 may be captured at an initial resolution (e.g., 2304×1728) higher than a final output resolution (e.g., 1920×1440) of the images. As shown in FIG. 3, the device 100 may crop the images to a smaller resolution (e.g., 480×360) for further processing at the image signal processor 112.

In some implementations, the image signal processor 112 scales the first image to match the FOV of the second image and identifies one or more spatial misalignments between the scaled first image and the second image. As shown in FIG. 3, the image signal processor 112 determines a translation matrix based on the one or more spatial misalignments, determines a confidence associated with the translation matrix, compares the confidence with a confidence threshold, determines a weighting factor in response to the confidence being greater than the confidence threshold, and applies the weighting factor to the translation matrix, as described with respect to FIG. 2. Thereafter, the image signal processor 112 may send the weighted translation matrix to the processor 104 (324).

The processor 104 may receive the first image (326) at the initial resolution and warp the first image to the second image using the weighted translation matrix from the image signal processor 112. In some aspects, the final output resolution of the warped first image (e.g., 1920×1440) may be less than the initial resolution (e.g., 2304×1728) of the first image 302. In this manner, the first image 302 may have a pixel margin between the final output resolution and the initial resolution. Thus, when the processor 104 warps (e.g., shifts and/or rotates) the first image 302 to the second image, only pixels within the pixel margin may be shifted or rotated out of frame, so the processor 104 may output (330) the warped image, for example, to a display of the device 100, without any loss of FOV or quality, because only pixels within the pixel margin may be shifted or rotated out of frame. In some implementations, the device 100 may then generate a preview image based on the warped first image and the second image 312.

Figure 4A:
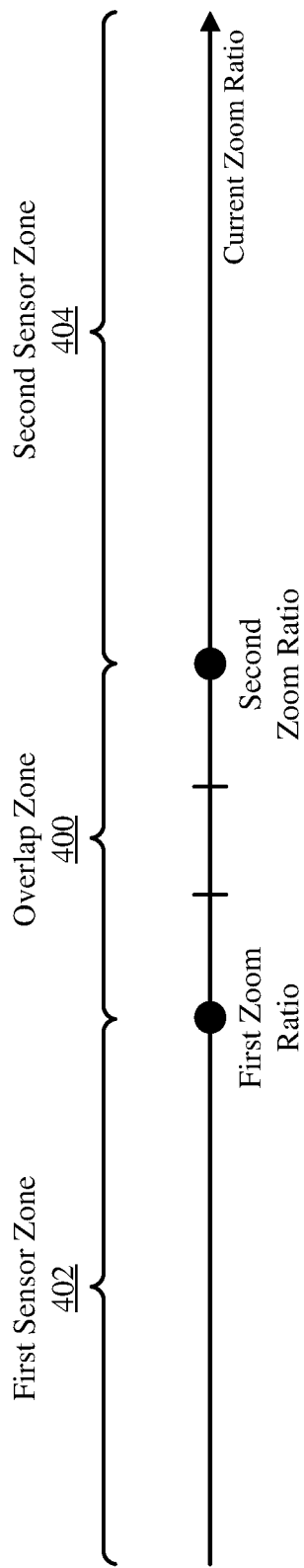
FIG. 4A illustrates an example overlap zone spanning between a first and a second zoom ratio of a device as a current zoom ratio of the device increases.

FIG. 4A illustrates an example overlap zone 400 spanning between a first zoom ratio and a second zoom ratio of a device as a current zoom ratio of the device increases. The device may be an example implementation of the device 100 shown in FIG. 1. While the overlap zone 400 is described with reference to the devices, components, and operations shown in the previous Figures, any suitable device or device components may perform the operations described with respect to FIG. 4A. In some implementations, the first sensor is an example implementation of the first image sensor 101 of FIG. 1 and may be a wide-angle image sensor (or "wide sensor"), and the second image sensor is an example implementation of the second sensor 102 of FIG. 1 and may be a tele image sensor (or "tele sensor").

When the current zoom ratio of the device 100 is within the first sensor zone 402, the device 100 may capture only wide images using only the wide sensor. In some implementations, the first sensor zone 402 may begin at the far-left side of FIG. 4A (e.g., a zoom ratio of 1.0×) and end at the "first zoom ratio" (e.g., a 2.7× zoom ratio). In contrast, when the current zoom ratio of the device 100 is within the second sensor zone 404, the device 100 may capture only tele images using only the tele sensor. In some implementations, the second sensor zone 404 may begin at the second zoom ratio (e.g., a zoom ratio of 3.0×) and end at the far-right side of FIG. 4A (e.g., a zoom ratio of 10.0×).

When the current zoom ratio of the device 100 is within the overlap zone (e.g., a zoom ratio between 2.7×-3.0×), the device 100 may capture wide images using the wide sensor concurrently with capturing tele images using the tele sensor, as described with respect to FIG. 2. The device 100 may determine that at least one of the captured wide images is spatially misaligned with at least one of the captured tele images, such as if the wide sensor and the tele sensor are spatially misaligned. Thus, as discussed above, the device 100 may determine a translation matrix, M, for warping the wide image into spatial alignment with the tele image, based on the spatial misalignment between the wide image and the tele image, determine a confidence associated with M, and compare the confidence with a confidence threshold to determine whether M may be used to align the wide and tele images at a level of accuracy above a value.

In some implementations, when the confidence is not greater than the confidence threshold, a weighting factor, r, for application to M, may be an identity matrix. In such implementations, the device 100 may generate an additional translation matrix based on identifying a spatial misalignment between an additional wide and tele image, for example, when the current zoom ratio changes. In some implementations, the device 100 may refrain from determining an additional translation matrix when the confidence is greater than the confidence threshold.

In response to the confidence being greater than the confidence threshold, the device 100 may determine r based on the first zoom ratio, the second zoom ratio, and the current zoom ratio. The device 100 may then apply r to M to generate a weighted translation matrix, M', and warp the wide image to the tele image using M'. In some implementations, the device 100 may increase r as the current zoom ratio increases within the overlap zone 400. For example, when the current zoom ratio is equal to the first zoom ratio, r may be 0%, and when the current zoom ratio is equal to the second zoom ratio, r may be 100%. In this manner, the device 100 may warp the wide image using the same (weighted) translation matrix, M, throughout the entire overlap zone 400.

In some implementations, the device 100 may increase r in proportion to the increase in the current zoom ratio within the overlap zone 400. To illustrate, the example of FIG. 4A includes two vertical lines between the first zoom ratio and the second zoom ratio to show three equal sections within the overlap zone 400. As a non-limiting example, the first zoom ratio may be 2.7×, the left vertical line may represent a zoom ratio of 2.8×, the right vertical line may represent a zoom ratio of 2.9×, and the second zoom ratio may be 3.0×. Thus, the device 100 may calculate r as 0% when the current zoom ratio is 2.7×, 33% when the current zoom ratio is 2.8×, 66% when the current zoom ratio is 2.9×, and 100% when the current zoom ratio is 3.0×. More specifically, the device 100 may calculate r as:

$$r = \frac{CurrentZoomRatio - FirstZoomRatio}{SecondZoomRatio - FirstZoomRatio}$$

In some implementations, the FirstZoomRatio may represent the zoom ratio at which the device 100 starts transitioning from capturing images of the scene using a first sensor to capturing images of the scene using a second, smaller FOV sensor. In such implementations, the first zoom ratio may be considered a start of a transition zone. In this example, the SecondZoomRatio may represent the zoom ratio at which the device 100 finishes transitioning from capturing images of the scene using the first sensor to capturing images of the scene using the second, smaller FOV sensor, and may be considered an end of the transition zone (or an "optical zoom ratio").

In an example of FIG. 4A, the FirstZoomRatio may be 2.7×, and the SecondZoomRatio may be 3.0×, which may represent a 1.0× zoom ratio from the perspective of the smaller FOV (e.g., tele) sensor. Thus, if the currentZoomRatio is 2.8×, the device 100 may calculate r as follows:

$$r = \frac{2.8 - 2.7}{3.0 - 2.7} = \frac{0.1}{0.3} = 33\%$$

In some implementations, the device 100 may then weight M according to the following formula, where I is the unity matrix, $$\begin{bmatrix} 1 & 0 & 0 \\ 0 & 1 & 0 \\ 0 & 0 & 1 \end{bmatrix},$$

and where $M'_n$ represents the weighted translation matrix, M', at the corresponding $n^{th}$ location within the overlap zone:

$$M'_n = |r * M_n + (1-r) * I|$$

For this example, where r=33%, the device 100 may calculate $M'_n$ as:

$$M'_n = |33\% * M_n + (100\% - 33\%) * I| = \left|\left(\frac{M_n + 2I}{3}\right)\right|$$

The device 100 may then use $M'_n$ to warp the wide image to the tele image. By dynamically increasing r as the current zoom ratio increases, the device 100 may use the same (dynamically weighted) translation matrix to warp the wide image to the tele image without reducing its FOV (e.g., 2.7×) throughout the entire overlap zone 400. In this manner, the device 100 may smoothly transition from capturing images of the scene using the wide sensor to capturing images of the scene using the tele sensor without reducing the FOV or quality of, for example, preview images generated based on the tele image and the warped wide image.

As another illustrative example of FIG. 4A, if the currentZoomRatio is 2.7×, the device 100 may calculate r and $M'_n$ as follows:

$$r = \frac{2.7 - 2.7}{3.0 - 2.7} = \frac{0.0}{0.3} = 0\%$$
$$M'_n = |0\% * M_n + (100\% - 0\%) * I| = I$$

As another illustrative example of FIG. 4A, if the currentZoomRatio is 3.0×, the device 100 may calculate r and $M'_n$ as follows:

$$r = \frac{3.0 - 2.7}{3.0 - 2.7} = \frac{0.3}{0.3} = 100\%$$
$$M'_n = |100\% * M_n + (100\% - 100\%) * I| = M_n$$

In some implementations not shown, the device may have more than two sensors, such as an ultra-wide sensor, a wide sensor, a tele sensor, and an ultra-tele sensor. In such implementations, the device may utilize the processes described above to smoothly transition between sensors as the current zoom ratio increases through a "first overlap zone" spanning from a particular zoom ratio within the ultra-wide sensor zoom range to a particular zoom ratio within the wide sensor zoom range. Similarly, the device may utilize the above-described processes to smoothly transition between sensors as the current zoom ratio increases through a "second overlap zone" spanning from a particular, higher zoom ratio within the wide sensor zoom range to a particular zoom ratio within the tele sensor zoom range. Similarly, the device may utilize the above-described processes to smoothly transition between sensors as the current zoom ratio increases through a "third overlap zone" spanning from a particular, higher zoom ratio within the tele sensor zoom range to a particular zoom ratio within the ultra-tele sensor zoom range.

Figure 4B:
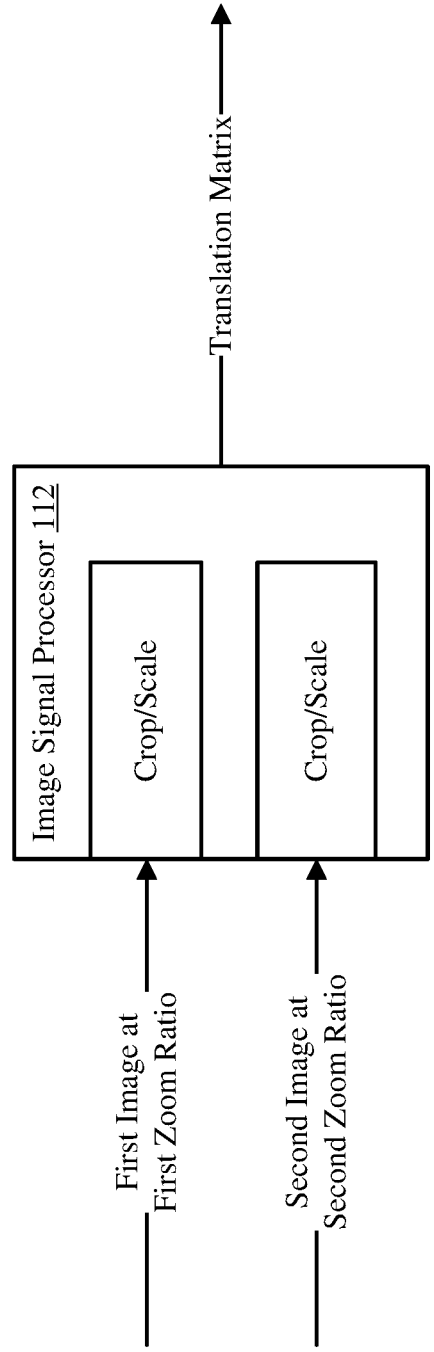
FIG. 4B shows a block diagram depicting an example operation for a device to generate a translation matrix as a current zoom ratio of the device increases.

FIG. 4B shows a block diagram 450 depicting an example operation for a device to generate a translation matrix as a current zoom ratio of the device increases. The device may be an example implementation of the device 100 shown in FIG. 1. While block diagram 450 is described with reference to the devices, components, and operations shown in the previous Figures, any suitable device or device components may perform the operations described with respect to block diagram 450.

As shown in FIG. 4B, the image signal processor 112 may receive a first image captured at a first zoom ratio (e.g., 2.7×) and a second image captured at a second zoom ratio (e.g., 3.0×). In some implementations, the first image may be a wide image captured using a wide sensor, and the second image may be a tele image captured using a tele sensor. In some implementations, the device 100 may adjust (e.g., crop and/or scale) the wide image to match the FOV of the tele image and generate the translation matrix, M, based on the adjusted wide image (e.g., at a 3.0×FOV) and the tele image. In some instances, the device 100 may also adjust (e.g., crop and/or scale) the tele image to the second zoom ratio (e.g., 3.0× in this example).

Figure 5A:
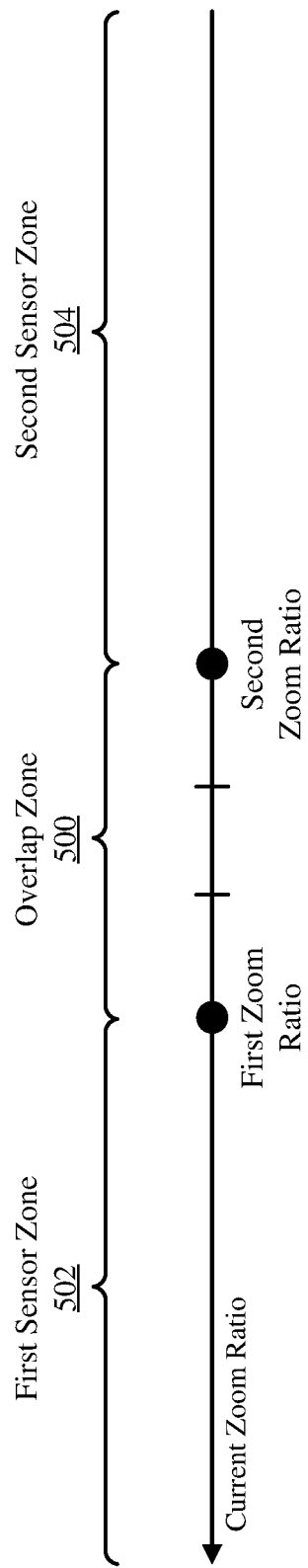
FIG. 5A illustrates an example overlap zone spanning between a first and a second zoom ratio of a device as a current zoom ratio of the device decreases.

FIG. 5A illustrates an example overlap zone 500 spanning between a first zoom ratio and a second zoom ratio of a device as a current zoom ratio of the device decreases. The device may be an example implementation of the device 100 shown in FIG. 1. While the overlap zone 500 is described with reference to the devices, components, and operations shown in the previous Figures, any suitable device or device components may perform the operations described with respect to FIG. 5A. In some implementations, the first sensor is an example implementation of the first image sensor 101 of FIG. 1 and may be a wide-angle image sensor (or "wide sensor"), and the second image sensor is an example implementation of the second sensor 102 of FIG. 1 and may be a tele image sensor (or "tele sensor").

Similar to FIG. 4A, when the current zoom ratio of the device 100 is within the first sensor zone 502, the device 100 may capture only wide images using only the wide sensor, when the current zoom ratio of the device 100 is within the second sensor zone 504, the device 100 may capture only tele images using only the tele sensor, and when the current zoom ratio of the device 100 is within the overlap zone 500 (2.7×-3.0× in this example), the device 100 may capture wide images using the wide sensor concurrently with capturing tele images using the tele sensor. As described with respect to FIG. 4A, the device 100 may determine a translation matrix, M, for warping a wide image into spatial alignment with a tele image, and may determine a weighting factor, r, for weighting M to generate a weighted translation matrix, M'.

In contrast to FIG. 4A, in some implementations, the device 100 may decrease r as the current zoom ratio decreases within the overlap zone 500. As a non-limiting example, the first zoom ratio may be 2.7×, the left vertical line may represent a zoom ratio of 2.8×, the right vertical line may represent a zoom ratio of 2.9×, and the second zoom ratio may be 3.0×. Thus, in a reverse manner as described with reference to FIG. 4A, the device 100 may calculate r as 0% when the current zoom ratio is 3.0×, 33% when the current zoom ratio is 2.9×, 66% when the current zoom ratio is 2.8×, and 100% when the current zoom ratio is 2.7×, generate $M'_n$ accordingly, and then warp the wide image to the tele image using M.

The device 100 may then use $M'_n$ to warp the wide image to the tele image. By dynamically decreasing r as the current zoom ratio increases, the device 100 may use the same (dynamically weighted) translation matrix to warp the wide image to the tele image without reducing its FOV (e.g., 2.7×) throughout the entire overlap zone 500. In this manner, the device 100 may smoothly transition from capturing images of the scene using the wide sensor to capturing images of the scene using the tele sensor without reducing the FOV or quality of, for example, preview images generated based on the tele image and the warped wide image.

Figure 5B:
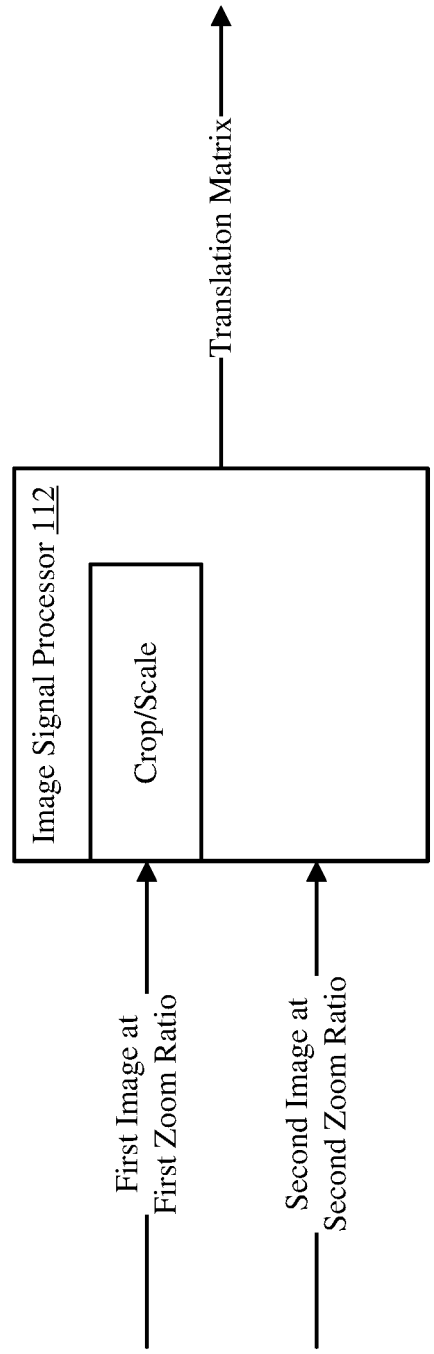
FIG. 5B shows a block diagram depicting an example operation for a device to generate a translation matrix as a current zoom ratio of the device decreases.

FIG. 5B shows a block diagram 550 depicting an example operation for a device to generate a translation matrix as a current zoom ratio of the device decreases. The device may be an example implementation of the device 100 shown in FIG. 1. While block diagram 550 is described with reference to the devices, components, and operations shown in the previous Figures, any suitable device or device components may perform the operations described with respect to the block diagram 550.

As shown in FIG. 5B, the image signal processor 112 may receive a first image captured at a first zoom ratio (e.g., 2.7×) and a second image captured at a second zoom ratio (e.g., 3.0×). In some implementations, the first image may be a wide image captured using a wide sensor, and the second image may be a tele image captured using a tele sensor. In some implementations, the device 100 may adjust (e.g., crop and/or scale) the wide image to match the FOV of the tele image and generate the translation matrix, M, based on the adjusted wide image (e.g., at a 3.0×FOV) and the tele image.

Figure 6:
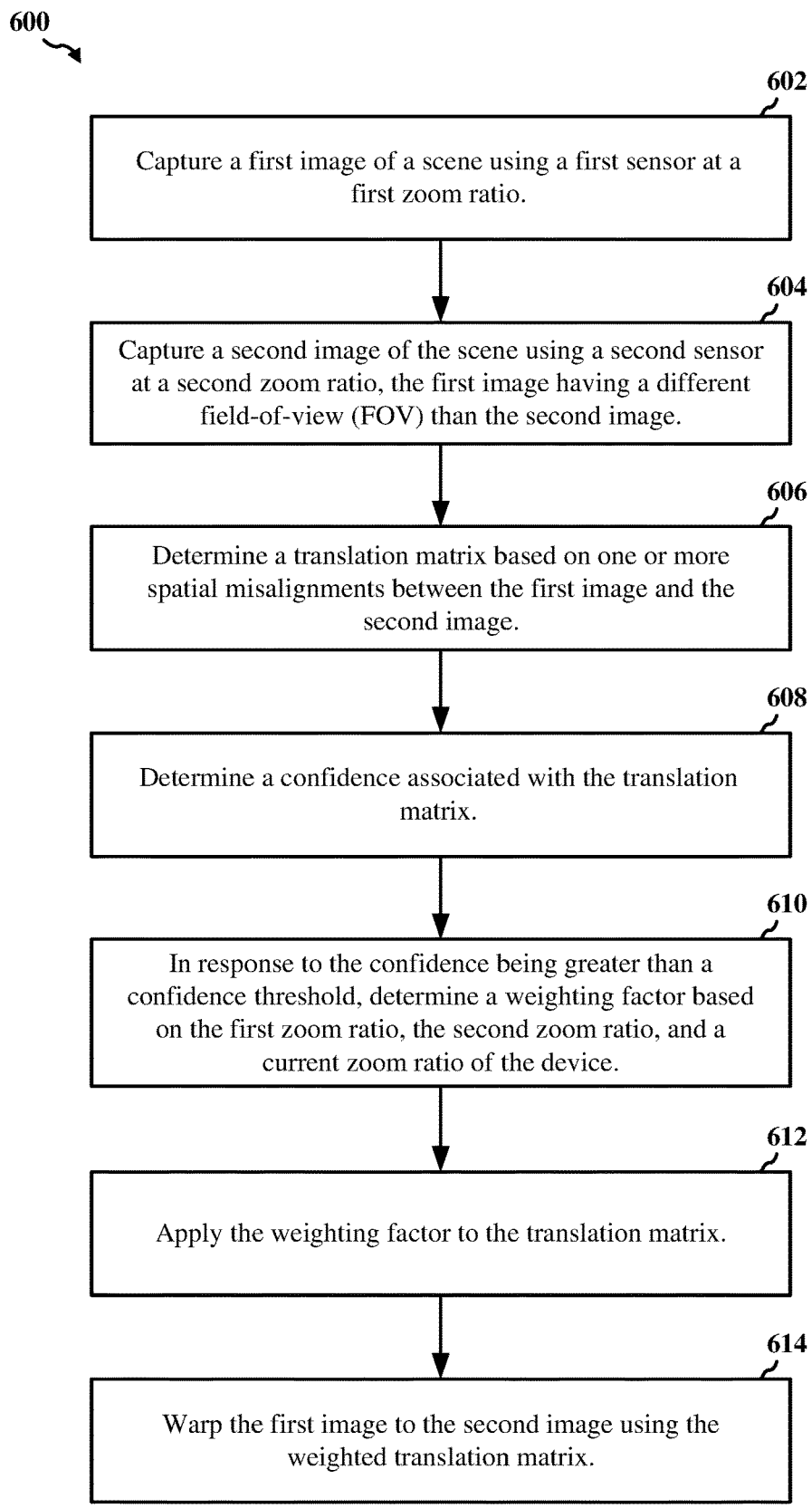
FIG. 6 shows a flowchart depicting an example operation for spatial alignment transform.

FIG. 6 shows a flowchart depicting an example operation 600 for spatial alignment transform. The operation 600 may be performed by a device such as the device 100 shown in FIG. 1. At block 602, the device captures a first image of a scene using a first sensor at a first zoom ratio. At block 604, the device captures a second image of the scene using a second sensor at a second zoom ratio, the first image having a different field-of-view (FOV) than the second image. At block 606, the device determines a translation matrix based on one or more spatial misalignments between the first image and the second image. At block 608, the device determines a confidence associated with the translation matrix. At block 610, in response to the confidence being greater than a confidence threshold, the device determines a weighting factor based on the first zoom ratio, the second zoom ratio, and a current zoom ratio of the device. At block 612, the device applies the weighting factor to the translation matrix. At block 614, the device warps the first image to the second image using the weighted translation matrix.

In some implementations, the first image is captured concurrently with the second image when the current zoom ratio is within an overlap zone spanning between the first zoom ratio and the second zoom ratio. In some instances, the weighting factor is 0% when the current zoom ratio is equal to the first zoom ratio and the weighting factor is 100% when the current zoom ratio is equal to the second zoom ratio. In some other instances, the weighting factor corresponds to an identity matrix when the confidence is not greater than the confidence threshold. In some implementations, the first image has a wider FOV than the second image. In some instances, the first sensor is a wide-angle image sensor and the second sensor is a tele image sensor.

Figure 7:
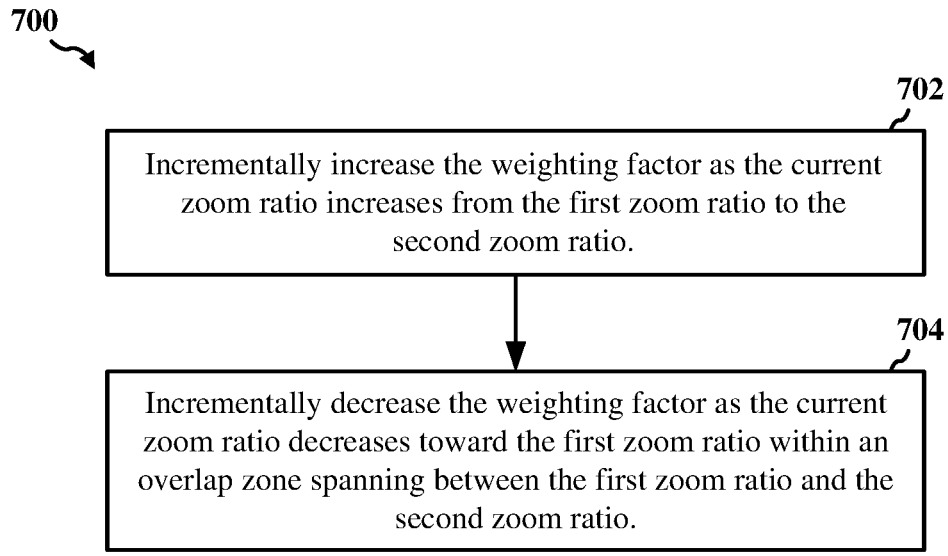
FIG. 7 shows a flowchart depicting another example operation for spatial alignment transform.

FIG. 7 shows a flowchart depicting another example operation 700 for spatial alignment transform. The operation 700 may be performed by a device such as the device 100 shown in FIG. 1. In various aspects, the operation 700 may be one implementation for determining the weighting factor in block 610 of the operation 600 of FIG. 6. In other various aspects, the operation 700 may begin after the operation 600 of FIG. 6. For example, the operation 700 may begin, in block 702, after warping the first image to the second image in block 614 of the operation 600. At block 702, the device incrementally increases the weighting factor as the current zoom ratio increases from the first zoom ratio to the second zoom ratio. At block 704, the device incrementally decreases the weighting factor as the current zoom ratio decreases toward the first zoom ratio within an overlap zone spanning between the first zoom ratio and the second zoom ratio.

Figure 8:
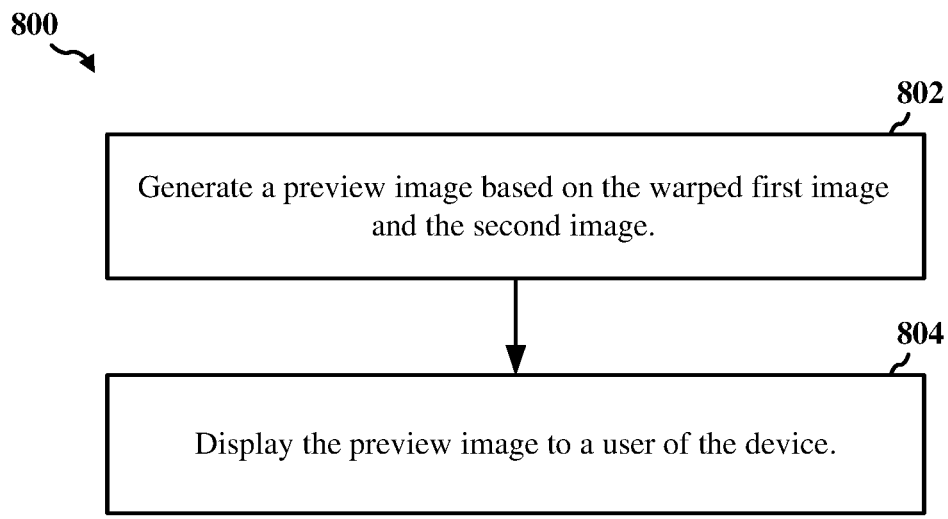
FIG. 8 shows a flowchart depicting another example operation for spatial alignment transform.

FIG. 8 shows a flowchart depicting another example operation 800 for spatial alignment transform. The operation 800 may be performed by a device such as the device 100 shown in FIG. 1. In various aspects, the operation 800 may begin after the operation 600 of FIG. 6. For example, the operation 800 may begin, in block 802, after warping the first image to the second image in block 614 of the operation 600. At block 802, the device generates a preview image based on the warped first image and the second image. At block 804, the device displays the preview image to a user of the device.

Figure 9:
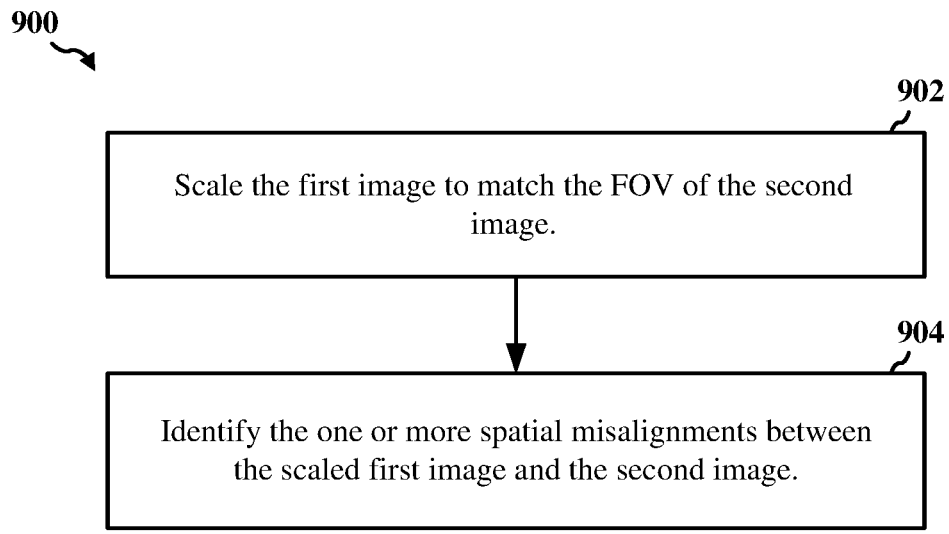
FIG. 9 shows a flowchart depicting another example operation for spatial alignment transform.

FIG. 9 shows a flowchart depicting another example operation 900 for spatial alignment transform. The operation 900 may be performed by a device such as the device 100 shown in FIG. 1. In various aspects, the operation 900 may begin, in block 902, after capturing the second image of the scene in block 604 of the operation 600 of FIG. 6. At block 902, the device scales the first image to match the FOV of the second image. At block 904, the device identifies the one or more spatial misalignments between the scaled first image and the second image.

Figure 10:
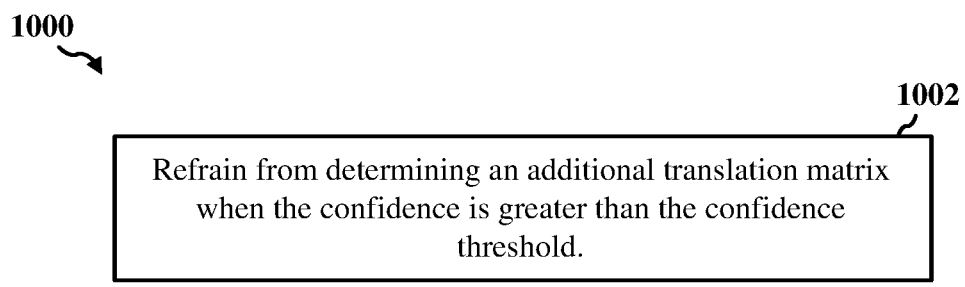
FIG. 10 shows a flowchart depicting another example operation for spatial alignment transform.

FIG. 10 shows a flowchart depicting another example operation 1000 for spatial alignment transform. The operation 1000 may be performed by a device such as the device 100 shown in FIG. 1. In various aspects, the operation 1000 may begin, in block 1002, after determining the confidence associated with the translation matrix in block 608 of the operation 600 of FIG. 6. At block 1002, the device refrains from determining an additional translation matrix when the confidence is greater than the confidence threshold.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits, and processes described above. Whether such functionality is implemented in hardware or software depends upon the particular application and design constraints imposed on the overall system.

The hardware and data processing apparatus used to implement the various illustrative logics, logical blocks, modules, and circuits described in connection with the aspects disclosed herein may be implemented or performed with a general purpose single- or multi-chip processor, a digital signal processor (DSP), an application specific integrated circuit (ASIC), a field programmable gate array (FPGA), or other programmable logic device, discrete gate, or transistor logic, discrete hardware components, or any combination thereof designed to perform the functions described herein. A general purpose processor may be a microprocessor, or any conventional processor, controller, microcontroller, or state machine. A processor may also be implemented as a combination of computing devices (such as a combination of a DSP and a microprocessor), a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification may also be implemented as one or more computer programs, i.e., one or more modules of computer program instructions encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM, or other optical disk storage, magnetic disk storage, or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure and the principles and novel features disclosed herein.

What is claimed is:

1. A device comprising:
   a processor; and
   a memory coupled to the processor and storing instructions that, when executed by the processor, cause the device to perform operations comprising:
      capturing a first image of a scene using a first sensor at a first zoom ratio;
      capturing a second image of the scene using a second sensor at a second zoom ratio, the first image having a different field-of-view (FOV) than the second image;
      determining a translation matrix based on one or more spatial misalignments between the first image and the second image;
      determining a confidence associated with the translation matrix;
      in response to the confidence being greater than a confidence threshold, determining a weighting factor based on the first zoom ratio, the second zoom ratio, and a current zoom ratio of the device;
      generating a weighted translation matrix at least in part by applying the weighting factor to the translation matrix; and
      warping the first image to the second image using the weighted translation matrix.

2. The device of claim 1, wherein the weighting factor comprises an identity matrix when the confidence is not greater than the confidence threshold.

3. The device of claim 1, wherein the first image is captured concurrently with the second image when the current zoom ratio is within an overlap zone spanning between the first zoom ratio and the second zoom ratio.

4. The device of claim 3, wherein the weighting factor is 0% when the current zoom ratio is equal to the first zoom ratio, and the weighting factor is 100% when the current zoom ratio is equal to the second zoom ratio.

5. The device of claim 3, wherein execution of the instructions causes the device to perform operations further comprising:

incrementally increasing the weighting factor as the current zoom ratio increases from the first zoom ratio to the second zoom ratio; and incrementally decreasing the weighting factor as the current zoom ratio decreases toward the first zoom ratio within the overlap zone.

6. The device of claim 1, wherein execution of the instructions causes the device to perform operations further comprising:

generating a preview image based on the warped first image and the second image; and displaying the preview image to a user of the device.

7. The device of claim 1, wherein the first image has a wider FOV than the second image.

8. The device of claim 1, wherein the first sensor comprises a wide-angle image sensor, and the second sensor comprises a tele image sensor.

9. The device of claim 1, wherein execution of the instructions causes the device to perform operations further comprising:

scaling the first image to match the FOV of the second image; and identifying the one or more spatial misalignments between the scaled first image and the second image.

10. The device of claim 1, wherein execution of the instructions causes the device to perform operations further comprising:

refraining from determining an additional translation matrix when the confidence is greater than the confidence threshold.

11. A method, comprising:

capturing a first image of a scene using a first sensor of a device at a first zoom ratio;

capturing a second image of the scene using a second sensor of the device at a second zoom ratio, the first image having a different field-of-view (FOV) than the second image;

determining a translation matrix based on one or more spatial misalignments between the first image and the second image;

determining a confidence associated with the translation matrix;

in response to the confidence being greater than a confidence threshold, determining a weighting factor based on the first zoom ratio, the second zoom ratio, and a current zoom ratio of the device;

generating a weighted translation matrix at least in part by applying the weighting factor to the translation matrix; and warping the first image to the second image using the weighted translation matrix.

12. The method of claim 11, wherein the weighting factor comprises an identity matrix when the confidence is not greater than the confidence threshold.

13. The method of claim 11, wherein the first image is captured concurrently with the second image when the current zoom ratio is within an overlap zone spanning between the first zoom ratio and the second zoom ratio.

14. The method of claim 13, wherein the weighting factor is 0% when the current zoom ratio is equal to the first zoom ratio, and the weighting factor is 100% when the current zoom ratio is equal to the second zoom ratio.

15. The method of claim 13, further comprising:

incrementally increasing the weighting factor as the current zoom ratio increases from the first zoom ratio to the second zoom ratio; and incrementally decreasing the weighting factor as the current zoom ratio decreases toward the first zoom ratio within the overlap zone.

16. The method of claim 11, further comprising:

generating a preview image based on the warped first image and the second image; and displaying the preview image to a user of the device.

17. The method of claim 11, wherein the first image has a wider FOV than the second image.

18. The method of claim 11, wherein the first sensor comprises a wide-angle image sensor, and the second sensor comprises a tele image sensor.

19. The method of claim 11, further comprising:

scaling the first image to match the FOV of the second image; and identifying the one or more spatial misalignments between the scaled first image and the second image.

20. The method of claim 11, further comprising:

refraining from determining an additional translation matrix when the confidence is greater than the confidence threshold.

21. A non-transitory computer-readable medium storing instructions that, when executed by a processor of a device, cause the device to perform operations comprising:

capturing a first image of a scene using a first sensor at a first zoom ratio;

capturing a second image of the scene using a second sensor at a second zoom ratio, the first image having a different field-of-view (FOV) than the second image;

determining a translation matrix based on one or more spatial misalignments between the first image and the second image;

determining a confidence associated with the translation matrix;

in response to the confidence being greater than a confidence threshold, determining a weighting factor based on the first zoom ratio, the second zoom ratio, and a current zoom ratio of the device;

generating a weighted translation matrix at least in part by applying the weighting factor to the translation matrix; and warping the first image to the second image using the weighted translation matrix.

22. The computer readable medium of claim 21, wherein the weighting factor comprises an identity matrix when the confidence is not greater than the confidence threshold.

23. The computer readable medium of claim 21, wherein the first image is captured concurrently with the second image when the current zoom ratio is within an overlap zone spanning between the first zoom ratio and the second zoom ratio.

24. The computer readable medium of claim 23, wherein the weighting factor is 0% when the current zoom ratio is equal to the first zoom ratio, and the weighting factor is 100% when the current zoom ratio is equal to the second zoom ratio.

25. The computer readable medium of claim 23, wherein execution of the instructions causes the device to perform operations further comprising:

incrementally increasing the weighting factor as the current zoom ratio increases from the first zoom ratio to the second zoom ratio; and incrementally decreasing the weighting factor as the current zoom ratio decreases toward the first zoom ratio within the overlap zone.

26. The computer readable medium of claim 21, wherein execution of the instructions causes the device to perform operations further comprising:
   generating a preview image based on the warped first image and the second image; and
   displaying the preview image to a user of the device.

27. The computer readable medium of claim 21, wherein the first image has a wider FOV than the second image.

28. The computer readable medium of claim 21, wherein the first sensor comprises a wide-angle image sensor, and the second sensor comprises a tele image sensor.

29. The computer readable medium of claim 21, wherein execution of the instructions causes the device to perform operations further comprising:
   scaling the first image to match the FOV of the second image; and
   identifying the one or more spatial misalignments between the scaled first image and the second image.

30. A device, comprising:
   means for capturing a first image of a scene using a first sensor at a first zoom ratio;
   means for capturing a second image of the scene using a second sensor at a second zoom ratio, the first image having a different field-of-view (FOV) than the second image;
   means for determining a translation matrix based on one or more spatial misalignments between the first image and the second image;
   means for determining a confidence associated with the translation matrix;
   means for in response to the confidence being greater than a confidence threshold, determining a weighting factor based on the first zoom ratio, the second zoom ratio, and a current zoom ratio of the device;
   means for generating a weighted translation matrix at least in part by applying the weighting factor to the translation matrix; and
   means for warping the first image to the second image using the weighted translation matrix.

* * * * *